United States Patent
Sivan et al.

(10) Patent No.: US 7,334,191 B1
(45) Date of Patent: Feb. 19, 2008

(54) SEGMENTATION AND DETECTION OF REPRESENTATIVE FRAMES IN VIDEO SEQUENCES

(75) Inventors: Zohar Sivan, Zichron Yaacov (IL); Kupeev Konstantin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 09/677,446

(22) Filed: Sep. 29, 2000

Related U.S. Application Data

(60) Provisional application No. 60/202,794, filed on May 9, 2000.

(51) Int. Cl.
*G06F 3/00* (2006.01)

(52) U.S. Cl. .................... 715/723; 715/721
(58) Field of Classification Search ........ 345/723–726, 345/474–475, 555, 960, 972; 348/700
See application file for complete search history.

(56) References Cited

U.S. PATENT DOCUMENTS

| | | | | |
|---|---|---|---|---|
| 5,237,648 | A * | 8/1993 | Mills et al. | 345/723 |
| 5,245,436 | A | 9/1993 | Alattar | |
| 5,388,197 | A * | 2/1995 | Rayner | 345/723 |
| 5,485,611 | A | 1/1996 | Astle | |
| 5,488,425 | A | 1/1996 | Grimes | |
| 5,519,828 | A * | 5/1996 | Rayner | 345/723 |
| 5,537,530 | A * | 7/1996 | Edgar et al. | 345/723 |
| 5,606,655 | A | 2/1997 | Arman et al. | |
| 5,635,982 | A | 6/1997 | Zhang et al. | |
| 5,751,378 | A | 5/1998 | Chen et al. | |
| 5,767,923 | A * | 6/1998 | Coleman, Jr. | 348/700 |
| 5,778,108 | A | 7/1998 | Coleman, Jr. | |
| 6,029,130 | A * | 2/2000 | Ariyoshi | 704/248 |
| 6,278,446 | B1 * | 8/2001 | Liou et al. | 715/700 |
| 6,331,859 | B1 * | 12/2001 | Crinon | 345/619 |

(Continued)

FOREIGN PATENT DOCUMENTS

EP    0938054    8/1999

(Continued)

OTHER PUBLICATIONS

G. Lu, *Multimedia Database Management Systems*, Artech House, Norwood, Mass., 1999, pp. 1-12, 179-200.

(Continued)

*Primary Examiner*—Kristine Kincaid
*Assistant Examiner*—Ryan Pitaro
(74) *Attorney, Agent, or Firm*—Darby & Darby

(57) ABSTRACT

A method for organizing a sequence of video frames includes selecting one of the frames in the sequence as an initial frame in a first portion of a segment of the sequence and adding further frames in the sequence, subsequent the initial frame, to the first portion, while a measure of similarity of each of the added frames to the frames already in the first portion is within a first predefined bound. One of the added frames in the first portion is selected to be a representative frame for the segment. A second portion of the segment is generated by adding still further frames in the sequence, subsequent to the last frame in the first portion, to the second portion, while the measure of similarity of the added frame to the representative frame is within a second predefined bound. The first and second portions together are determined to constitute the segment that is represented by the representative frame.

15 Claims, 3 Drawing Sheets

U.S. PATENT DOCUMENTS

| | | | |
|---|---|---|---|
| 6,549,643 B1* | 4/2003 | Toklu et al. | 382/107 |
| 6,782,049 B1* | 8/2004 | Dufaux et al. | 375/240.01 |
| 7,184,100 B1* | 2/2007 | Wilf et al. | 348/700 |

OTHER PUBLICATIONS

I.K. Sethi et al., "A Statistical Approach to Scene Change Detection", *Proceedings of the Conference on Storage and Retrieval for Image and Video Databases III* (*SPIE Proceedings* 2420, San Jose, Calif., Feb. 1995), pp. 329-338.

Zhaung et al., "Adaptive Key Frame Extraction Using Unsupervised Clustering", *Proceedings of the IEEE International Conference on Image Processing*, Chicago, Oct. 1998, pp. 866-870.

Y. Taniguchi et al., "PanaramaExcerpts: Extracting and Packing Panoramas for Video Browsing", in *Proc. ACM Multimedia 97*, pp. 427-436, 1997.

W. Wolf, "Key Frame Selection by Motion Analysis", *Proceedings of ICASSP 96*, IEEE Press, 1996, pp. 1228-1231.

M. La Cascia et al., "JACOB: Just a Content-Based Query System for Video Databases", *Proc. Of ICASSP-96*, May 7-10, 1996, Atlanta, Ga, pp. 1216-1219.

A. Hanjalic et al., "Automation of Systems Enabling Search on Stored Video Data", *Proceedings of the Conference on Storage and Retrieval for Image and Video Databases V* (*SPIE Proceedings* 3022, San Jose, Calif., 1997), pp. 427-438.

N. Dimitrova et al., "Video Keyframe Extraction and Filtering: A Keyframe is not a Keyframe to Everyone", *Proceedings of the 6th Int. Conf. On Information and Knowledge Management*, Nov. 10-14, 1997, Las Vegas, pp. 113-120.

Y. Taniguchi et al., "An Intuitive and Effective Access Interface to Real-Time Incoming Video Based on Automatic Indexing", *ACM Multimedia 95—Electronic Proceedings*, Nov. 5-9, 1995, San Francisco, Calif., 14 pages.

http://www. mate.co.il/pages/products.html.

* cited by examiner

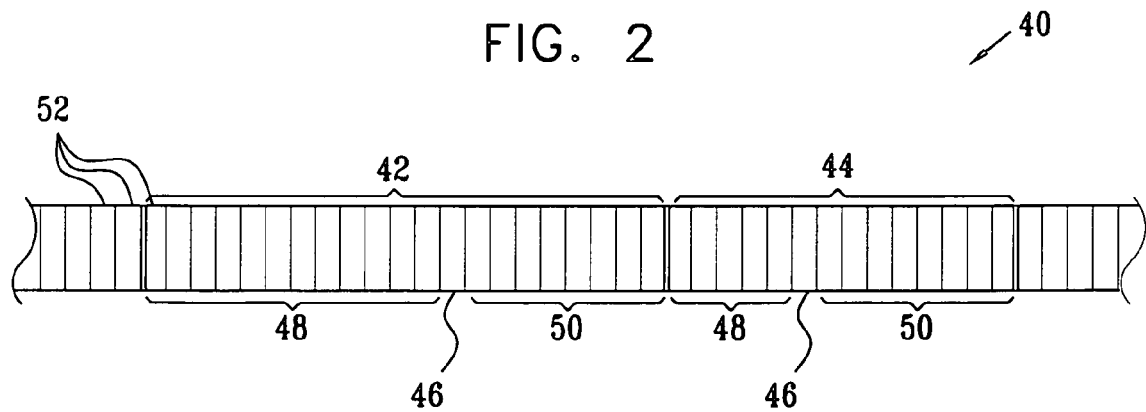
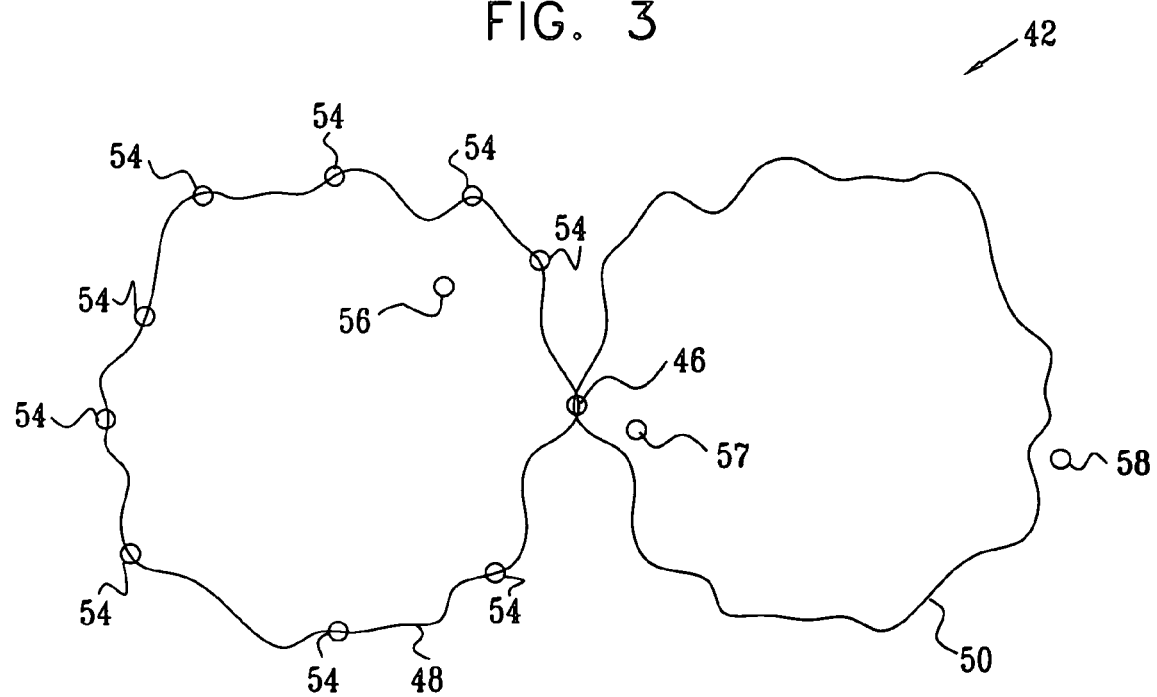

SEGMENTATION AND DETECTION OF REPRESENTATIVE FRAMES IN VIDEO SEQUENCES

CROSS-REFERENCE TO RELATED APPLICATIONS

This application claims the benefit of a U.S. provisional patent application 60/202,794 entitled "Efficient Segmentation and Detection of Representative Frames in Video Sequences," filed May 9, 2000, which is assigned to the assignee of the present patent application and is incorporated herein by reference.

FIELD OF THE INVENTION

The present invention relates generally to digital processing of video sequences, and specifically to methods for selecting representative frames from a video sequence.

BACKGROUND OF THE INVENTION

Because of the huge number of frames in a typical video sequence, it is necessary in many applications to select a small number of characteristic frames to represent the larger sequence. Such frames are known in the art as representative frames, or r-frames. They are used, for example, in multimedia indexing and retrieval systems (MIRS) and in video archives, in order to facilitate efficient search and recall of video information. An overview of these applications is provided by Lu in *Multimedia Database Management Systems* (Artech House, 1999), which is incorporated herein by reference. A typical method for indexing a video database in this manner is described in U.S. Pat. No. 5,485,611, which is likewise incorporated herein by reference. R-frames can also be used for video compression at low bit rates, by encoding only a representative subset of the original video sequence.

In order for a video processing computer to choose the proper r-frames in a sequence, it is generally necessary first for the computer to divide the sequence into segments. Most of the work that has been done on automatic video sequence segmentation has focused on identifying shots. A shot is a group of sequential frames depicting continuous action in time and space. Methods for detecting shot transitions are described, for example, by Sethi et al., in "A Statistical Approach to Scene Change Detection," published in *Proceedings of the Conference on Storage and Retrieval for Image and Video Databases III* (SPIE Proceedings 2420, San Jose, Calif., 1995), pages 329-338, which is incorporated herein by reference. Further methods for finding shot transitions and identifying r-frames within a shot are described in U.S. Pat. Nos. 5,245,436, 5,606,655, 5,751,378, 5,767,923 and 5,778,108, which are also incorporated herein by reference.

When a shot is taken with a stationary camera and not too much action, a single r-frame will generally represent the shot adequately. When the camera is moving, however, there may be big differences in content between different frames in a single shot. Therefore, a better representation of the video sequence can be achieved by grouping frames into smaller segments that have similar content. An approach of this sort was adopted, for example, in U.S. Pat. No. 5,635,982, which is incorporated herein by reference. This patent describes an automatic video content parser, used to perform video segmentation and key frame (i.e., r-frame) extraction for video sequences having both sharp and gradual transitions. The system analyzes the temporal variation of video content and selects a key frame once the difference of content between the current frame and a preceding key frame exceeds a set of preselected thresholds. In other words, for each of the segments found by the system, the first frame in the segment is the r-frame, followed by a group of subsequent frames that are not too different from the r-frame.

Another approach to r-frame selection is described by Zhuang et al., in "Adaptive Key Frame Extraction Using Unsupervised Clustering," in *Proceedings of the IEEE International Conference on Image Processing* (Chicago, October, 1998), pages 866-870, which is incorporated herein by reference. The authors divide each shot in a video sequence into one or more clusters of frames that are similar in visual content, but are not necessarily sequential. For example, the frames may be clustered according to characteristics of their color histograms, with frames from both the beginning and the end of a shot being grouped together in a single cluster. A centroid of the clustering characteristic is computed for each cluster, and the frame that is closest to the centroid is chosen to be the key frame for the cluster.

SUMMARY OF THE INVENTION

Preferred embodiments of the present invention provide an improved method and system for dividing a video sequence into segments, and for finding an optimal r-frame to represent each segment. Each segment comprises a sequential group of video frames, all of which are no more than a predetermined distance away from a chosen r-frame. The distance is measured in terms of an image similarity metric or coordinates of the images in a parameter space, as is known in the art. The segments are made as long as possible, within the limitation of maintaining similarity between all of the frames in the segment and the r-frame. Because of the similarity criterion, however, the chosen segments are in some cases shorter than entire shots, particularly when there is camera motion or substantial change in scene content during a shot.

Thus, the present invention typically provides r-frames that represent the content of a video sequence more faithfully than do methods known in the art, including both the shot-oriented and cluster-oriented methods mentioned in the Background of the Invention. The distance allowed between the r-frame and other frames in each segment can be adjusted to increase or decrease the number of segments into which a sequence will be divided, and hence to adjust the number of r-frames that will be generated. Because the segments are made as large as possible (within the limitation of the distance criterion), with the r-frame in the middle of the segment, rather than at the beginning, the methods of the present invention typically generate fewer r-frames than do methods known in the art, thus representing the video sequence more efficiently.

In preferred embodiments of the present invention, each segment is built up by first selecting one of the frames in the sequence, preferably the first frame after the end of a preceding segment, as an initial frame. Further frames in the sequence, subsequent the initial frame, are added in order to generate a first portion of the segment. The similarity (or distance) of each of the added frames to the frames already in the first portion is evaluated. The process of generating the first portion continues until a frame is reached that is outside the distance limit of the other frames that have already been added to the segment. The last frame added before the distance limit was exceeded is chosen to be the r-frame.

A second portion of the segment is then built up, by adding still further frames in the sequence, as long as the distance of each of the added frames is within the distance limit of the r-frame. When one of the frames passes the limit, the second portion of the segment is closed. The first and second portions together constitute the segment that is represented by the r-frame, so that all of the frames in the segment are within the specified distance of the r-frame. Optionally, the r-frame may be taken inside the first portion of the segment, rather than being the last frame in the portion, and, additionally or alternatively, different distance limits may be applied to the first and second portions. For the most part, however, the best results are obtained by using the same distance criterion for both portions of the segment.

In some preferred embodiments of the present invention, in order to enhance the efficiency of calculation, the distance of each of the frames added to the first portion of the segment is measured only with respective to a bounding subset of the frames already in the portion, rather than from all of the other frames. The bounding subset is preferably chosen to consist of a predetermined number of frames, whose cumulative distances one from another are maximal (without exceeding the distance limit in any case). When the bounding subset is chosen in this manner, it covers substantially the entire "volume" of the first portion of the segment in the parameter space in which the distances are measured. Therefore, the likelihood is minimized that any two frames included in the segment may be more than the maximum permitted distance apart.

Preferably, the bounding subset is updated as each new frame is added to the segment. Most preferably, a temporary subset is constructed by adding the new frame to the current bounding subset. Then, if the new frame has a greater cumulative distance from the other frames in the temporary subset than does one of the frames currently in the bounding subset, the new frame is taken to replace that frame in the bounding subset for processing of subsequent frames.

Preferred embodiments of the present invention are particularly useful in automatically generating r-frames for use in multimedia indexing and retrieval systems and in video archives. R-frames generated by these preferred embodiments can also be used in low bit rate compression, and the possibility afforded by the present invention of adjusting the size of the segments that are generated is particularly useful in this context. Other applications of the principles of the present invention in the field of video and image processing will be apparent to those skilled in the art.

There is therefore provided, in accordance with a preferred embodiment of the present invention, a method for organizing a sequence of video frames, including:

selecting one of the frames in the sequence as an initial frame in a first portion of a segment of the sequence;

adding further frames in the sequence, subsequent the initial frame, to the first portion, while a measure of similarity of each of the added frames to the frames already in the first portion is within a first predefined bound;

selecting one of the added frames in the first portion to be a representative frame for the segment; and generating a second portion of the segment by adding still further frames in the sequence, subsequent to the last frame in the first portion, to the second portion, while the measure of similarity of the added frame to the representative frame is within a second predefined bound; and determining the first and second portions together to constitute the segment that is represented by the representative frame.

Preferably, selecting the frame as the initial frame includes selecting the first frame subsequent to a final frame in a preceding segment.

Further preferably, adding the further frames includes, for each of the added frames, computing at least one parameter indicative of a characteristic of the added frame, and the measure of similarity includes a distance measured between the parameters of the added frame and the frames already in the first portion. Most preferably, computing the at least one parameter includes computing a vector of parameters, and the distance includes a vector distance.

Additionally or alternatively, adding the further frames includes finding a bounding subset of the frames in the first portion, and adding the further frames to the first portion while the distance between each of the added frames and the frames in the representative set is within the predefined bound. Preferably, finding the bounding subset includes selecting the subset so as to maximize a sum of the distances between all of the frames in the subset. Most preferably, selecting the subset includes determining the sum of the distances between one of the further frames added to the sequence and the frames in the bounding subset, and replacing one of the frames in the subset with the one of the further frames if replacing the one of the frames in the subset will increase the sum of the distances between all of the frames in the subset.

Further additionally or alternatively, selecting the representative frame includes selecting a final one of the frames added to the first portion to be the representative frame. Preferably, the frame in the sequence following the representative frame is outside the first predefined bound of the frames in the first portion.

In a preferred embodiment, the method includes storing the sequence in an archive, and indexing the archive using the representative frame.

In another preferred embodiment, the method includes compressing the sequence using the representative frame.

There is also provided, in accordance with a preferred embodiment of the present invention, apparatus for organizing a sequence of video frames, including a video processor, which is arranged to select one of the frames in the sequence as an initial frame in a first portion of a segment of the sequence and to add further frames in the sequence, subsequent the initial frame, to the first portion, while a measure of similarity of each of the added frames to the frames already in the first portion is within a first predefined bound, and to select one of the added frames in the first portion, preferably the last frame added to the first portion, to be a representative frame for the segment, and further arranged to generate a second portion of the segment by adding still further frames in the sequence, subsequent to the last frame in the first portion, to the second portion, while the measure of similarity of the added frame to the representative frame is within a second predefined bound, so as to determine the first and second portions together to constitute the segment that is represented by the representative frame.

In a preferred embodiment, the apparatus includes a storage device, wherein the processor is arranged to store the sequence in the storage device, and to create an index to the sequence using the representative frame.

There is additionally provided, in accordance with a preferred embodiment of the present invention, a computer software product for organizing a sequence of video frames, including a computer-readable medium in which program instructions are stored, which instructions, when read by a computer, cause the computer to select one of the frames in the sequence as an initial frame in a first portion of a segment of the sequence, to add further frames in the sequence, subsequent the initial frame, to the first portion, while a measure of similarity of each of the added frames to the frames already in the first portion is within a first predefined bound, to select one of the added frames in the first portion, preferably the last frame added to the first portion, to be a representative frame for the segment, to generate a second portion of the segment by adding still further frames in the sequence, subsequent to the last frame in the first portion, to the second portion, while the measure of similarity of the added frame to the representative frame is within a second predefined bound; and to determine the first and second portions together to constitute the segment that is represented by the representative frame.

The present invention will be more fully understood from the following detailed description of the preferred embodiments thereof, taken together with the drawings in which:

BRIEF DESCRIPTION OF THE DRAWINGS

FIG. 2 is a schematic representation of a sequence of video frames, which is divided into segments in accordance with a preferred embodiment of the present invention;

FIG. 3 is a schematic representation of a distribution of video frames in a parameter space, in accordance with a preferred embodiment of the present invention;

DETAILED DESCRIPTION OF PREFERRED EMBODIMENTS

Figure 1:
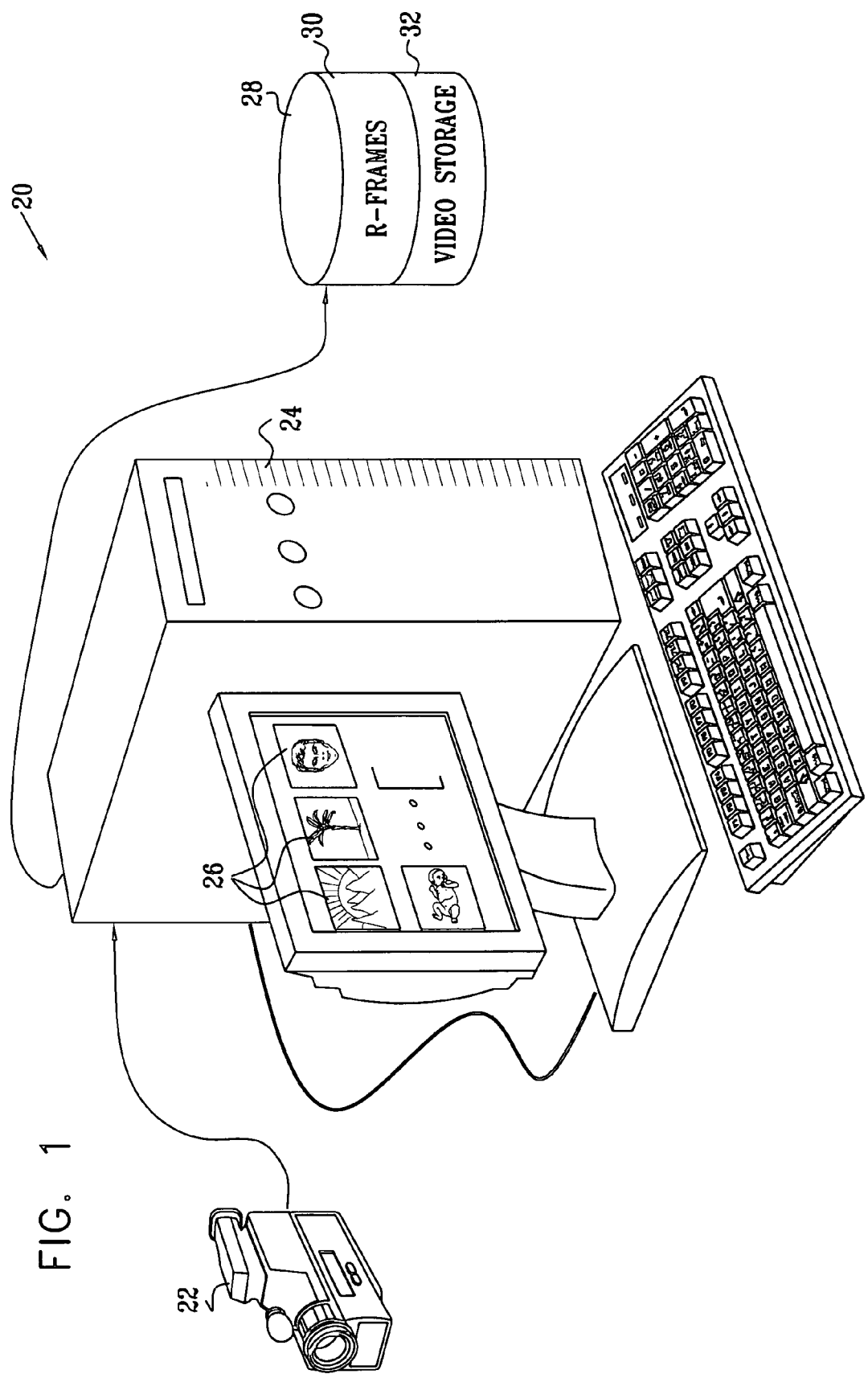
FIG. 1 is a schematic, pictorial illustration of a system for video indexing and storage, in accordance with a preferred embodiment of the present invention.

FIG. 1 is a schematic, pictorial illustration of a system 20 for video archiving and indexing, in accordance with a preferred embodiment of the present invention. System 20 comprises a video source 22, which may be a camera, videotape player, or substantially any other device known in the art for generating and/or playing back video sequences. A video processor 24 identifies segments within the input sequences from source 22 and extracts r-frames 26, as described hereinbelow. The processed video sequences are typically stored in an archive 28 or other memory, preferably including both a storage section 32, containing the video sequences themselves, and an index section 30, in which the r-frames are held for reference. Alternatively, the processor may compress the video sequences using the extracted r-frames.

Processor 24 typically comprises a general purpose computer, equipped with software suitable for carrying out the methods of the present invention. The software may be downloaded to processor 24 in electronic form or, alternatively, it may be furnished on tangible media, such as CD-ROM or non-volatile memory. Alternatively or additionally, some or all of the video processing functions of processor 24 may be carried out by custom hardware circuits or by a programmable digital signal processor.

Reference is now made to FIGS. 2 and 3, which illustrate conceptually the methods of the present invention. FIG. 2 schematically represents a sequence 40 of video frames 52, which is divided by processor 24 into segments 42 and 44, using methods described hereinbelow. Each segment comprises a first portion 48 and a second portion 50, with an r-frame 46 intermediate the first and second portions. Formally, as described below, the r-frame can be considered to be both the last frame in the first portion and the first frame in the second portion.

The division of sequence 40 into segments 42 and 44 is determined by a distance measured between frames with respect to a given characteristic of the frames, wherein the less similarity there is between two frames, the greater will be the distance between them. Various distance measures of this sort are known in the art and can be used in the present context. These measures are based generally on computing a vector of parameters that characterize each frame, and then finding the distance between the vectors in the parameter space. In a preferred embodiment, the distance is determined by computing a luminance histogram $H_i(Y)$ for each frame, with the luminance (Y) values preferably quantized to 32 levels. The distance between any pair of frames (i,j) is then given by:

$$D_{ij} = \sum_{Y=1}^{32} |H_i(Y) - H_j(Y)| \tag{1}$$

In this case, the chrominance components (U,V) are ignored. Alternatively, a three-dimensional RGB histogram could be used:

$$D_{ij} = \sum_r \sum_g \sum_b |H_i(r, g, b) - H_j(r, g, b)| \tag{2}$$

Other possible distance measures will be apparent to those skilled in the art.

FIG. 3 shows the frames of segment 42 as they are distributed in the relevant parameter space. (For simplicity, only a two-dimensional space is shown, rather than the multi-dimensional space of equations (1) and (2).) In principle, all of the frames in first portion 48 should be within a predetermined distance limit of one another. Finding the distances among all of the frames in a large portion 48, however, is computationally too burdensome. Instead, in the course of building up first portion 48, by adding consecutive frames from sequence 40, a subset of bounding frames 54 is used, as defined hereinbelow, to determine the frames to be included in the first portion of the segment, such as a frame 56.

The last frame to be added to the first portion is preferably r-frame 46. The next frame after the r-frame, such as a frame 57, is already in second portion 50. Thus, the r-frame is chosen to be the last frame in segment 42, since frame 57 is distant from one of bounding frames 54 by more than the specified distance limit. Frames are now added to second portion 50 until one of the frames, such as a frame 58, is more than the specified distance limit from the r-frame. Frame 58 will then typically be the first frame in the next segment, such as segment 44. Optionally, a filtering procedure is applied in either or both of the first and second portions of the segment to avoid having a spurious frame or noise cause premature termination of a segment.

Figure 4:
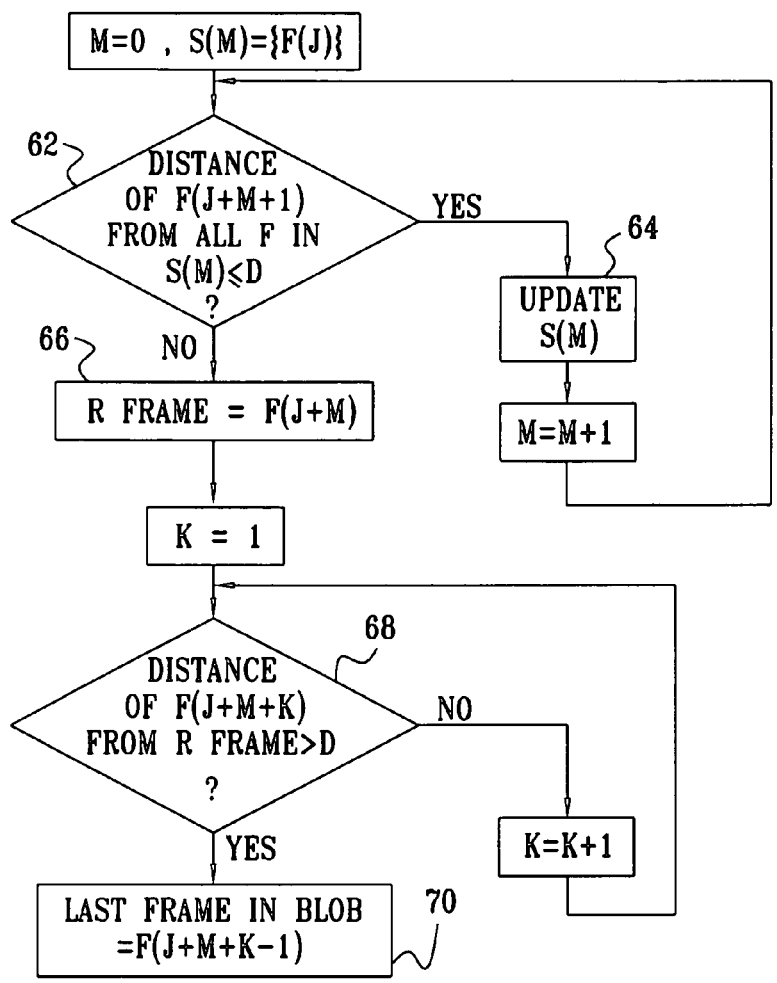
FIG. 4 is a flow chart that schematically illustrates a method for defining a segment in a video sequence and choosing an r-frame in the segment, in accordance with a preferred embodiment of the present invention.

FIG. 4 is a flow chart that schematically illustrates a method for generating segment 42 and identifying key frame 46, in accordance with a preferred embodiment of the present invention. The method begins with an initial frame in the segment, F(J), and considers subsequent frames F(J+M), M=1, 2, 3, . . . , for inclusion in first portion 48 of the segment. For each frame added to the first portion, the next frame F(J+M+1) is assessed at a first evaluation step 62. The distance of the frame from each of frames 54 in the bounding subset S(M) of portion 48 is compared to a maximum distance D. If all of the distances are less than D, frame F(J+M+1) is added to first portion 48. The bounding subset is preferably updated, at a subset update step 64. Details of this step are described hereinbelow with reference to FIG. 5.

If frame F(J+M+1) is found to be outside the limits of S(M), then the preceding frame F(J+M) is designated to be r-frame 46 for this segment 42, at an r-frame designation step 66. Beginning at this point, frames F(J+M+K) are added to second portion 50, for K=1, 2, 3, . . . , at a second evaluation step 68. The distance of each new frame from r-frame 46 is determined, and the new frames are added to the segment as long as all of them are less than D away from the r-frame. When one of the frames exceeds the distance limit, the preceding frame F(J+M+K−1) is designated as the last frame in the segment.

Figure 5:
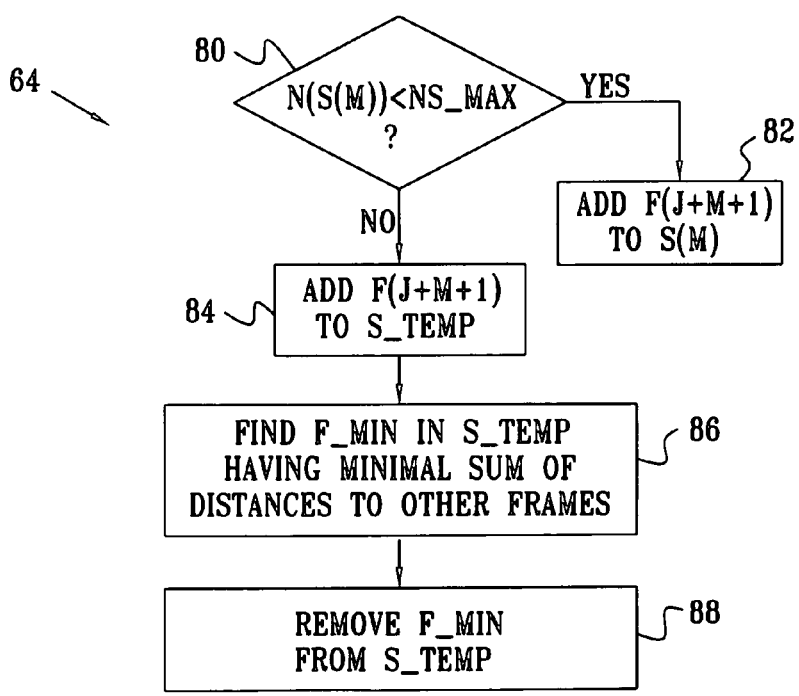
FIG. 5 is a flow chart that schematically illustrates a method for generating and updating a bounding subset of the frames in a video segment, in accordance with a preferred embodiment of the present invention.

FIG. 5 is a flow chart that schematically illustrates details of subset update step 64, in accordance with a preferred embodiment of the present invention. For the purposes of this step, the number of frames 54 in the bounding subset S(M) at any step M is defined as N(S(M)). For the sake of efficiency, the maximum size of the bounding subset is set to be NS_MAX, wherein typically NS_MAX=6. When first portion 48 of segment 42 is just starting to be built up, there will necessarily be fewer than NS_MAX frames in S(M). Thus, as long as N(S(M)) remains less than NS_MAX, at a subset size evaluation step 80, each new frame F(J+M+1) added to first portion 48 is also added to S(M), at a subset addition step 82.

Once S(M) has reached its maximum size, however, step 80 branches to a different procedure, beginning at a temporary addition step 84. At this step, a family of frames S_TEMP is created by adding F(J+M+1) to S(M). For each of the frames in S_TEMP, the sum of its distances from all of the other frames in S_TEMP is determined. Preferably, for the frames already in S(M), the distances from the other frames in S(M) that were computed in previous iterations are saved, in order to avoid having to repeat them at each new iteration. Then, a frame F_MIN is identified among all of the frames in S_TEMP as the frame having the smallest sum of distances from the other frames, at a minimum determination step 86. F_MIN is removed from S_TEMP, at a minimum removal step 88. If F_MIN was one of the frames previously in S(M), it is replaced in S(M+1) by the new frame F(J+M+1), and the saved distances among the frames are updated accordingly.

The bounding subset S(M) that is generated by the procedure of FIG. 5 provides nearly optimal coverage of first portion 48 in the parameter space in which the distances among the frames are measured. To illustrate this point, let $P_1$ be the volume in the space that is covered by S(M):

$$P_1 = \bigcap_{F \in S(M)} R_D(F) \qquad (3)$$

wherein $R_D$ is a sphere of radius D around the location of frame F. Let B be the set of all of the frames F in portion 48, and let $P_2$ be the volume in the space that is distant by more than D from any one of the frames, i.e., $$P_2 = \bigcup_{F \in B} \overline{R_D(F)} \qquad (4)$$

Any intersection between $P_1$ and $P_2$ is an area of error in coverage of B by S(M). Maximizing the distances among the frames in S(M), as provided by the method of FIG. 5, will tend to minimize $P_1$ and thus to minimize the intersection of $P_1$ and $P_2$. Therefore, the frames in S(M) are updated at each iteration of the method whenever it is possible to increase the sum of the distances among them.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for organizing a sequence of video frames, comprising:

generating a first portion of a segment of the sequence by:
for each frame beginning from an initial frame in the sequence, computing a multi-dimensional vector of parameters indicative of a characteristic of the frame;
determining vector distances between the frames in the sequence responsively to differences in the multi-dimensional vector of parameters among the frames; and
finding, responsively to the distances, a bounding subset comprising at least three of the frames in the sequence, chosen so as to maximize a sum of the distances between all of the at least three frames in the subset, while each of the distances is no greater than a predetermined maximum, such that the first portion comprises the frames in the sequence that are bounded by the at least three of the frames in the bounding subset;

selecting one of the frames in the first portion to be a representative frame for the segment; and generating a second portion of the segment by adding to the segment further frames in the sequence subsequent to the first portion while determining that the respective distances between the added further frames and the representative frame are within a predefined bound.

2. A method according to claim 1, wherein the initial frame comprises the first frame subsequent to a final frame in a preceding segment.

3. A method according to claim 1, wherein selecting one of the frames to be the representative frame comprises selecting a final one of the frames added to the first portion to be the representative frame.

4. A method according to claim 3, wherein the frame in the sequence following the representative frame is outside the bounding subset.

5. A method according to claim 1, and comprising storing the sequence in an archive, and indexing the archive using the representative frame.

6. A method according to claim 1, and comprising compressing the sequence using the representative frame.

7. A method according to claim 1, wherein selecting the bounding subset comprises:
   choosing an initial bounding subset;
   determining the sum of the distances between one of the further frames added to the sequence and the frames in the initial bounding subset; and
   replacing one of the frames in the initial bounding subset with the one of the further frames if replacing the one of the frames will increase the sum of the distances between all of the frames in the subset.

8. A method according to claim 1, wherein selecting the one of the frames to be the representative frame comprises, upon determining that a distance between a given frame in the sequence and at least one of the frames in the bounding subset is greater than the predetermined maximum, terminating generation of the first portion and choosing as the representative frame the one of the frames immediately preceding the given frame in the sequence, and
   wherein generating the second portion comprises adding the given frame to the second portion.

9. Apparatus for organizing a sequence of video frames, comprising:
   a storage device, for storing the sequence; and
   a video processor, which is arranged to generate a first portion of a segment of the sequence by computing, for each frame beginning from an initial frame in the sequence, a multi-dimensional vector of parameters indicative of a characteristic of the frame, by determining vector distances between the frames in the sequence responsively to differences in the multi-dimensional vector of parameters among the frames, and by finding, responsively to the distances, a bounding subset comprising at least three of the frames in the sequence, chosen so as to maximize a sum of the distances between all of the at least three frames in the subset, while each of the distances is no greater than a predetermined maximum, such that the first portion comprises the frames in the sequence that are bounded by the at least three of the frames in the bounding subset, wherein the video processor is arranged to select one of the frames in the first portion to be a representative frame for the segment, and to generate a second portion of the segment by adding to the segment further frames in the sequence subsequent to the first portion while determining that the respective distances between the added further frames and the representative frame are within a predefined bound.

10. Apparatus according to claim 9, wherein the initial frame comprises the first frame subsequent to a final frame in a preceding segment of the sequence.

11. Apparatus according to claim 9, wherein the representative frame comprises the final one of the frames added to the first portion of the segment.

12. Apparatus according to claim 11, wherein the frame in the sequence following the representative frame is outside the bounding subset.

13. Apparatus according to claim 9, wherein the processor is arranged to create an index to the sequence in the storage device using the representative frame.

14. Apparatus according to claim 9, wherein the processor is arranged to compress the sequence using the representative frame.

15. A computer software product for organizing a sequence of video frames, comprising a computer-readable medium in which program instructions are stored, which instructions, when read by a computer, cause the computer to generate a first portion of a segment of the sequence by computing, for each frame beginning from an initial frame in the sequence, a multi-dimensional vector of parameters indicative of a characteristic of the frame, by determining vector distances between the frames in the sequence responsively to differences in the multi-dimensional vector of parameters among the frames, and by finding, responsively to the distances, a bounding subset comprising at least three of the frames in the sequence, chosen so as to maximize a sum of the distances between all of the at least three frames in the subset, while each of the distances is no greater than a predetermined maximum, such that the first portion comprises the frames in the sequence that are bounded by the at least three of the frames in the bounding subset, and
   1. wherein the instructions cause the computer to select one of the frames in the first portion to be a representative frame for the segment, and to generate a second portion of the segment by adding to the segment further frames in the sequence subsequent to the first portion while determining that the respective distances between the added further frames and the representative frame are within a predefined bound.

* * * * *